United States Patent [19]

Hosono et al.

[11] E Patent Number: Re. 33,633

[45] Reissued Date of Patent: Jul. 9, 1991

[54] METHOD AND DEVICE FOR CHARGING OR DISCHARGING A MEMBER

[75] Inventors: Nagao Hosono; Yukio Nagase; Tatsuo Takeuchi, all of Tokyo; Hidemi Egami, Zami; Hiroshi Satomura, Hatogaya, all of Japan

[73] Assignee: Canon Kabushiki Kaisha, Tokyo, Japan

[21] Appl. No.: 342,693

[22] Filed: Apr. 24, 1989

Related U.S. Patent Documents

Reissue of:

[64] Patent No.: 4,589,053
Issued: May 13, 1986
Appl. No.: 618,248
Filed: Jun. 7, 1984

U.S. Applications:

[63] Continuation of Ser. No. 193,731, May 13, 1988, abandoned.

[30] Foreign Application Priority Data

Mar. 26, 1984 [JP] Japan ..... 59-57706
Jun. 6, 1984 [JP] Japan ..... 59-114501

[51] Int. Cl.[5] ..... H05F 3/04

[52] U.S. Cl. ..... 361/213; 361/220; 361/229; 361/230

[58] Field of Search ..... 361/212-214, 361/220, 225, 229, 230, 235; 250/324-326

[56] References Cited

U.S. PATENT DOCUMENTS 3,811,048 5/1974 Matsumoto et al. ..... 361/230 X
3,813,547 5/1974 Silverberg ..... 250/324
4,057,723 11/1977 Sarid et al. ..... 361/226 X
4,110,614 8/1978 Sarid et al. ..... 250/326 X
4,155,093 5/1979 Fotland et al. ..... 346/159

FOREIGN PATENT DOCUMENTS 0000789 2/1979 European Pat. Off. .
0102569 3/1984 European Pat. Off. .
57-205757 12/1982 Japan .
58-48073 3/1983 Japan .
58-48074 3/1983 Japan .
58-108559 6/1983 Japan .
WO82/00723 3/1982 PCT Int'l Appl. .
WO83/00751 3/1983 PCT Int'l Appl. .
1039681 8/1966 United Kingdom .
2012493 7/1979 United Kingdom .
2079067 1/1982 United Kingdom .

*Primary Examiner*—L. T. Hix
*Assistant Examiner*—David M. Gray
*Attorney, Agent, or Firm*—Fitzpatrick, Cella, Harper & Scinto

[57] ABSTRACT

A method of charging or discharging a member including the steps of, opposing to a member to be acted on, a discharging member having a dielectric member, an inducing electrode and a discharging electrode sandwiching the dielectric member so that the discharging electrode faces the member to be acted on, applying an alternating voltage between the inducing electrode and the discharging electrode to produce a surface discharge on a surface of the dielectric member at the discharging electrode side, wherein a charge density of the surface discharge area is changed in the direction of the width of the discharging electrode, and moving the member to be acted on relative to the discharging electrode to be subjected to a low charge density portion and then to a high charge density portion to charge or discharge the member to be acted on by the thus formed surface discharge.

16 Claims, 6 Drawing Sheets

METHOD AND DEVICE FOR CHARGING OR DISCHARGING A MEMBER

Matter enclosed in heavy brackets [ ] appears in the original patent but forms no part of this reissue specification; matter printed in italics indicates the additions made by reissue.

*This application is a continuation-in-part of application Ser. No. 193,731 filed May 13, 1988, now abandoned, which was an application for reissue of U.S. Pat. No. 4,589,053.*

BACKBROUND OF THE INVENTION

This invention relates to a method of electrically charging or discharging a member and a discharging device using the same, which are usable with an electrostatic recording process, an electrophotography process and the like.

In the field of electrophotography and electrostatic recording, corona chargers and dischargers are known and widely used, in which a high voltage is applied to a fine wire of a diameter 0.1 mm, for example, to produce corona discharge. However, they involve a drawback that the wire is easily broken because it is thin. Also, the wire is easily stained or dusted, which results in non-uniform corona production, and therefore, non-uniform charging or discharging of a member to be charged or discharged. In addition, a conductive shield which encloses the corona wire has to be remote therefrom by a certain distance, so that there is a limitation in reducing the size of the device.

Another type of discharger has been proposed, as disclosed in U.S. Pat. No. 4,155,093 corresponding to Japanese Laid-Open Patent Application No. 53537/1979, wherein a dielectric member is sandwiched by two electrodes. By applying alternating voltage between the electrodes, positive and negative ions are produced at the junction between the dielectric member and one of the electrodes. Of these ions, the ions of a desired polarity are is extracted by an external electric field. This type of discharger is advantageous in that the size can be much reduced by making the dielectric member thin (not more than 500 microns preferably 20-200 microns).

The present invention is intended to further improve the discharging device of this type.

SUMMARY OF THE INVENTION

It is a principal object of the present invention to provide a method and a device whereby a member to be charged or discharged is subjected to an increasing charging or discharging power to avoid an abrupt charging operation.

It is another object of the present invention to provide a method and a device whereby a member to be charged or discharged is substantially uniformly charged or discharged.

It is a further object of the present invention to provide a device which is small in size and whereby a member to be charged or discharged is substantially uniformly charged or discharged.

It is a further object of the present invention to provide a device of high charging or discharging efficiency with a power supply of relatively low voltage.

It is a further object of the present invention to provide a method and a device which are stable in operation against variations in ambient conditions, such as the temperature and humidity and whereby a member to be charged or discharged is satisfactorily uniformly charged or discharged.

These and other objects, features and advantages of the present invention will become more apparent upon a consideration of the following description of the preferred embodiments of the present invention taken in conjunction with the accompanying drawings.

According to an embodiment of the present invention, there is provided a device for charging or discharging a member, comprising, a dielectric member, an inducing electrode and a discharging electrode sandwiching the dielectric member, and a power source for applying an alternating voltage between the inducing electrode and the discharging electrode to produce a surface discharge on a surface of the dielectric member at the discharging electrode side, wherein a charge density of the surface discharge area is changed in the direction of width of the discharging electrode, and abrupt charging operation can be avoided.

DESCRIPTION OF THE PREFERRED EMBODIMENT

Figure 1:
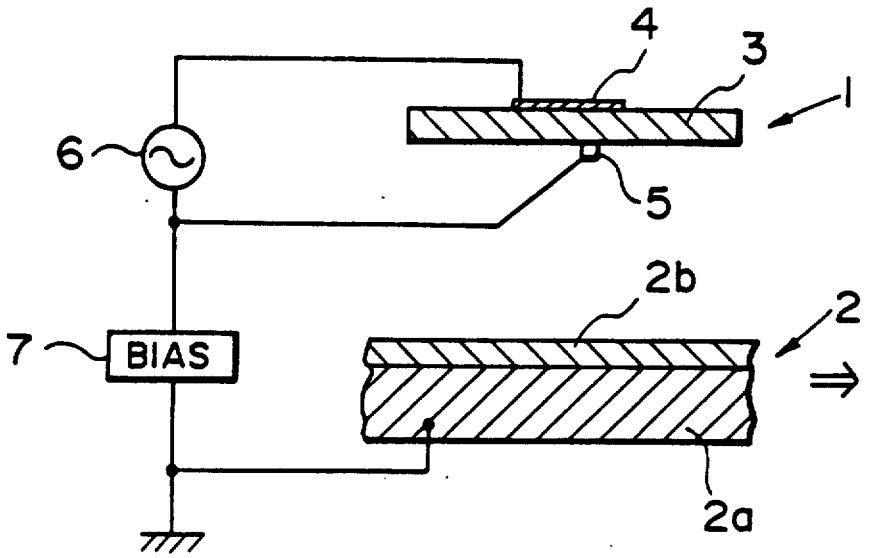
FIG. 1 shows a discharging device according to an embodiment of the present invention.
Figure 2:
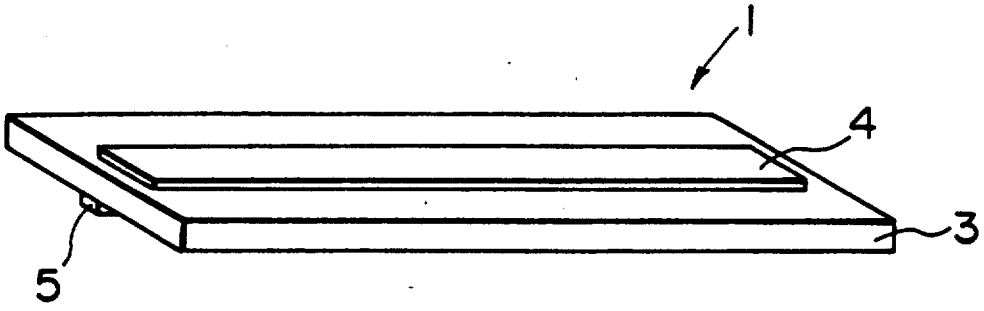
FIG. 2 is a perspective view of a discharging member used with the discharging device shown in FIG. 1.

Referring to FIG. 1, there is shown a discharging device according to the present invention, which includes a discharging member 1 opposed to a member 2 to be charged or discharged (hereinafter simply called a member to be charged). The discharging member 1 comprises a dielectric member 3, an inducing electrode 4 and a discharging electrode 5. FIG. 2 is a perspective view of the the discharging member 1. The discharging electrode 5 is a single linear elongate member disposed so as to extend parallel to the center of the inducing electrode 4.

Between the inducing electrode 4 and the discharging electrode 5, an alternating voltage is applied by alternating voltage applying means 6. On the other hand, the member 2 to be charged which is moved in the direction of the arrow relative to the discharging device 1, comprises a conductive base member 2a and an insulating or photoconductive member 2b. Between the conductive layer 2a and the discharging electrode 5, a bias voltage is applied by bias voltage applying means 7.

In operation, when the alternating voltage is applied between the inducing electrode 4 and the discharging electrode 5, an electric discharging occurs adjacent to the discharging electrode 5 to produce sufficient positive and negative ions. Because of the bias voltage applied between the discharging electrode 5 and the conductive base 2a of the member 2 the positive or negative ions are selectively extracted and directed to the insulating or photoconductive layer 2b surface of the member 2 so as to charge it to a desired level in the selected polarity.

As for the material of the dielectric member, a relatively high hardness material, such as ceramics, mica, glass or the like, or a flexible organic high polymer, such as polyimide resin, ethylene tetrafluoride, polyester, aclylic material vinyl chloride polyethylene or the like, may be used.

Figure 3A:
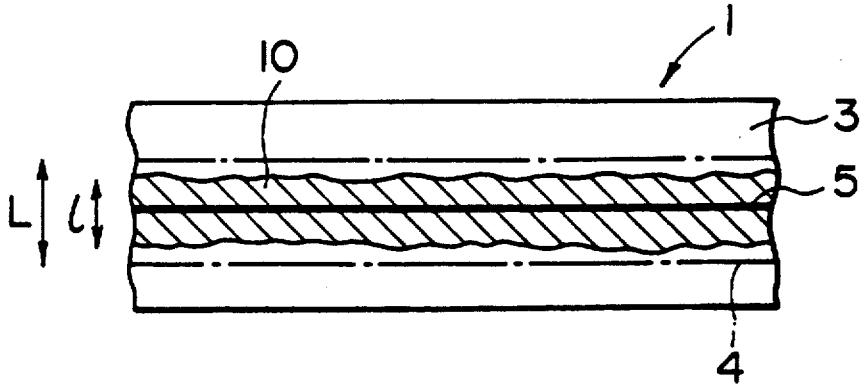
FIG. 3A shows a state of surface discharge when the present invention is not used.
Figure 3B:
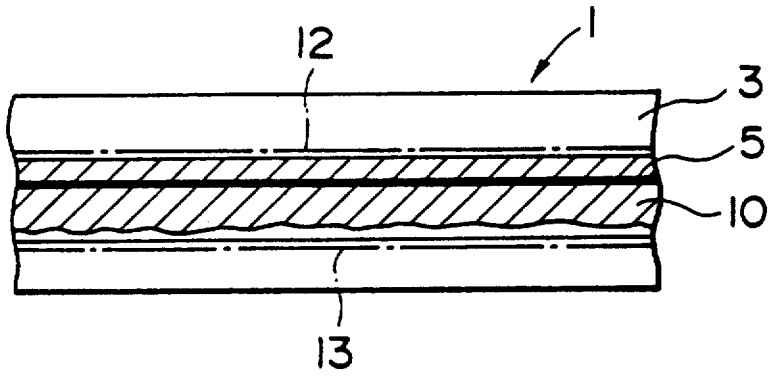
FIGS. 3B and 3C show states of surface discharge in the charging or discharging method and in the discharging device according to an embodiment of the present invention.

FIGS. 3A and 3B show states of surface discharge at the discharging electrode 5, as seen from the side of the discharging electrode 5, when the alternating voltage is applied between the inducing electrode 4 and the discharging electrode 5 of the discharging device 1 shown in FIGS. 1 and 2. In these Figures the inducing electrode 4 contacted to the backside of the dielectric member 3 is shown by phantom lines. The width thereof is designated by L. The hatched area is the area in which the surface discharge occurs along the surface of the dielectric member 3 at the both sides of the discharging electrode 5.

FIG. 3A shows the state of the surface discharge when the present invention is not used. The surface discharge area 10 extends from both lateral sides of the discharging electrode 5, and the width 1 thereof is not even along the length of the discharging electrode 5. Therefore, when the member 2 to be charged is opposed to the discharging electrode 5 and moved relative thereto as shown in FIG. 1 to charge the insulating or photoconductive layer 2a, the surface thereof is not uniformly charged, that is, the surface potential distribution is non-uniform in the longitudinal direction, because of the above-described non-uniformness.

It has been found that the width 1 of the surface discharge area 10 changes with the peak-to-peak value of the alternating voltage applied between the inducing electrode 4 and the discharging electrode 5.

Figure 4:
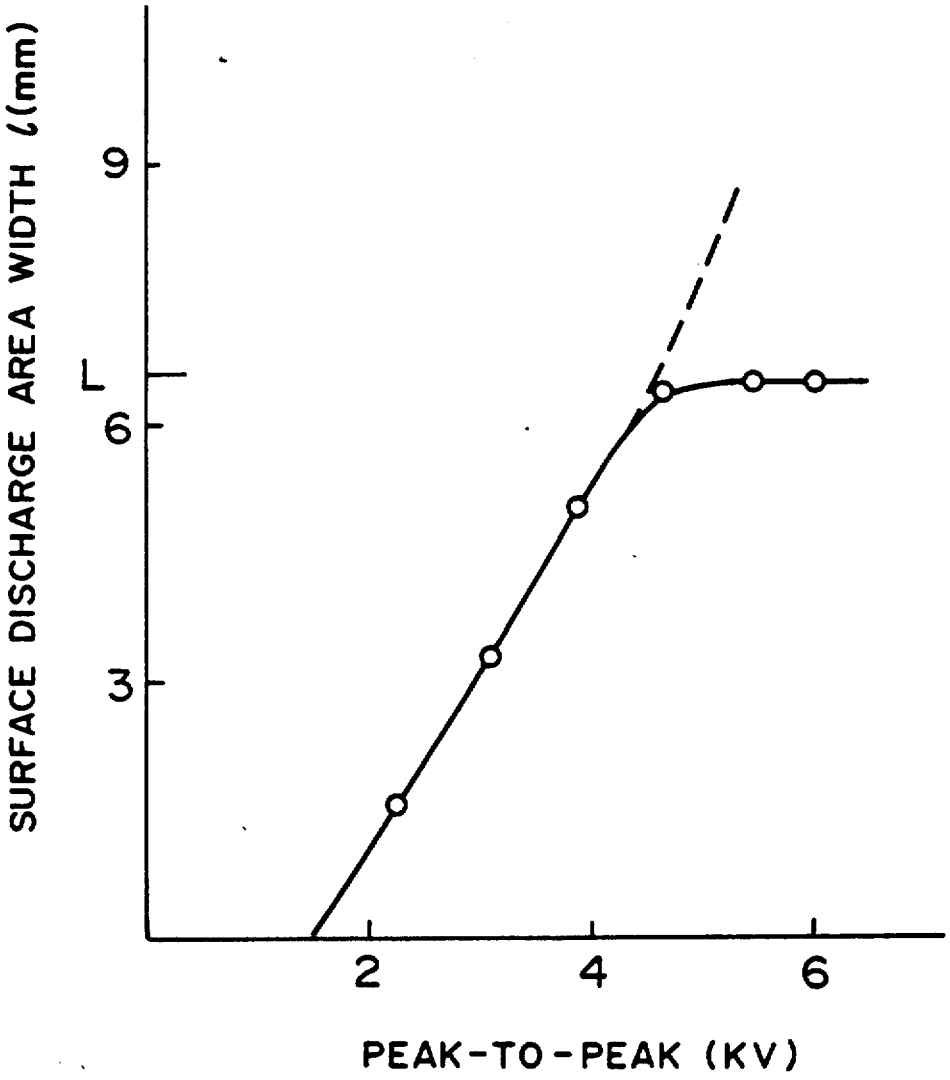
FIG. 4 shows a relation between a peak-to-peak value of an alternating voltage applied to the discharging device.

FIG. 4 shows this, the peak-to-peak value vs the width of the surface discharge area 10. The surface discharge starts at the a particular peak-to-peak voltage. With the increase of the peak-to-peak value, the surface discharge area width increases and finally saturates. The surface discharge area width, when saturated, is substantially equal to the width L of the inducing electrode 4, that is, the surface discharge area extends substantially as far as the lateral ends of the inducing electrode 4. It does not extend beyond the lateral ends even if the peak-to-peak value is further increased. The used dielectric member 3 was of alumina ceramics having the thickness of 200 microns, and the discharging electrode 3 and the inducing electrode 4 were 500 microns wide and 6.5 mm wide, respectively.

The present invention utilizes this to provide a substantially uniform charging of the member 2 to be charged over the entire length of the discharging device 1, independently of the non-uniformness of the dielectric member 3 material and/or the score of the electrodes and others.

FIG. 3B shows the present invention. As shown, the discharging electrode 5 is parallel with the center line of inducing electrode 4, but displaced toward one of the lateral ends of inducing electrode 4 (in this Figure, toward the upper end). Therefore, the distance from the discharging electrode 5 is smaller to said one of the lateral ends than to the other end, of the inducing electrode 4 (the lower end). Because of this displacement, the upper boundary 12 of surface discharge area 10 comes closer to the upper lateral end of inducing electrode 4, but it saturates at the upper lateral end, and it does not extend beyond the lateral end, as will be understood from the explanation with FIG. 4. Thus, the upper boundary of surface discharge area 10 is substantially rectilinear over the entire length of the discharging member 1, and the ion density within the upper part of the surface discharge area is uniform over the length thereof. The lower boundary of surface discharge area 10 remains non-uniform. However, by moving member 2 under the discharging member 1 as shown in FIG. 1 in the direction of arrow so the that the member 2 is first subjected to the ions of the lower part (FIG. 3B) and then subjected to the upper part thereof, the influence of the non-uniformness at the lower part is reduced by the uniform discharging area of the upper part, so that a substantially uniform charging can be effected. This arrangement corresponds to displacing the discharging electrode 5 rightwardly in FIG. 1 from the center of the inducing electrode 4.

Another important advantage will next be explained. Where the discharging electrode 5 is displaced as shown in FIG. 3B, for example, the upper surface discharge area has a higher charge density than the lower part. Therefore, when member 2 is moved in the direction described above, the member 2 is subjected, during the first half, to relatively weak charging operation and is then subjected, during the last half, to relatively strong charging operation with the high charge density surface discharge area so as to be charged to a desired level.

A photosenitive member, for example, should not abruptly be charged up to a high level, since then the service life thereof is shortened, or a pin hole can be formed therein. This is well-known. The present invention is highly advantageous for the purpose of such use, since the first half of the charging operation is with the weaker charging powder, and the last half can be sufficiently strong to charge it up to the desired level within a limited period of time.

It has been found that the lower boundary 13 of the surface discharge area 10 can be extended to the lower lateral end of inducing electrode 4 by raising the peak-to-peak value of the alternating voltage applied between the inducing electrode 4 and the discharging electrode 5. With the increase of the peak-to-peak value, the lower boundary 13 of the surface discharge area expands toward the lower lateral end of inducing electrode 4 and finally saturates. The lower boundary 13, when saturated, reaches substantially to the lower lateral end of the inducing electrode 4. It does not expand beyond the lateral end even if the peak-to-peak value is further increased. The present invention utilizes this to make uniform the surface discharge area width over the entire length of the discharging device 1, independently of the non-uniformness of the dielectric member 3 material and/or the score of the electrodes and others. Additionally, rapid or sudden charging can be avoided.

Figure 3C:
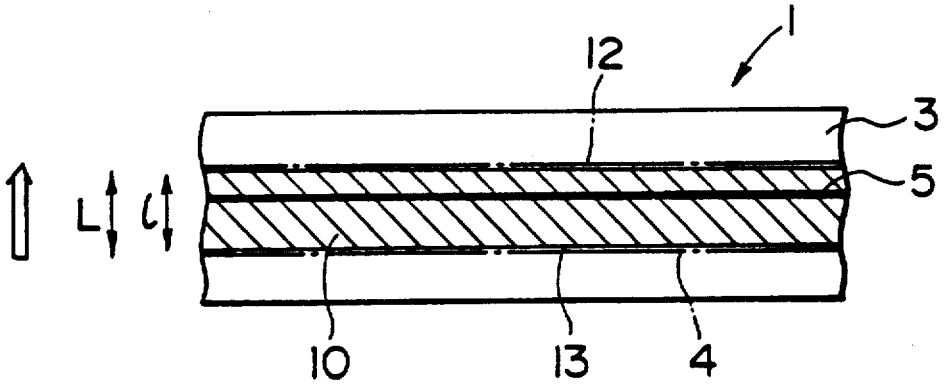

FIG. 3C shows the surface discharge 10 of the discharging device of the present invention using this phenomenon. The peak-to-peak value of the alternating voltage is so selected as to extend both of the lateral ends of the surface discharge area substantially to the respective lateral ends of the inducing electrode 4 over the entire length of the discharging device 1. Then, as shown in FIG. 3C, the width of the surface discharge area 10 is substantially equal to the width of the inducing electrode 4 and therefore uniform. Since the applied voltage is alternating, the width, very strictly speaking, changes at a high frequency, but the maximum width is substantially equal to the width of the inducing electrode 4 and is uniform.

When the member 2 to be charged is subjected to the charging operation in the manner shown in FIG. 1 with the above described discharger, the member 2 to be charged is further uniformly charged. As described above, the surface discharge area 10 does not extend beyond the width L of the inducing electrode 4, even if the voltage is increased. The only change is the increase of the charge density in the surface discharge area 10. The charge densities within the upper and lower surface discharge areas are respectively uniform in the longitudinal direction. Since the charge density at the upper surface discharge area is higher than that of the lower discharge area, abrupt charging operation can be avoided similarly to FIG. 3B embodiment.

By using this phenomenon to the maximum extent, a charging can be made relatively stable against the change in ambient conditions so that a satisfactory charging can be effected.

As described above, according to the present invention, the small size discharger is improved in its non-uniformness of the charging. And, without the necessity of use of a special control means, the member to be charged or discharged can be firstly acted on weakly and then acted on strongly up to a desired level.

The dielectric member 3 of alumina ceramics having the thickness of 200 microns was sandwiched by the discharging electrode 5 having the width of 500 microns and the inducing electrode 4 having the width of 4 mm. The discharging electrode 5 was displaced by 1 mm toward one of lateral ends (upper end in FIG. 3B) of the inducing electrode 4, from the center thereof. Between the discharging electrode 5 and the inducing electrode 4, an alternating voltage having the peak-to-peak value of 2 KVpp was applied. The surface discharge area did not extend to the lateral ends of the inducing electrode 4. When the member 2 to be charged was subjected to the discharging member 1 with the output of the bias voltage by the bias source 7 being 2 KV, the non-uniformity of plus and minus 8% was measured on the surface of the member 2.

Then, the alternating voltage was increased up to 3 KVpp to extend the upper end of the surface discharage area 10 substantially to the upper lateral end of the inducing electrode 4, and the charging was carried out under the same conditions. The measured non-uniformity was plus and minus 4.5%. Further, the alternating voltage is raised up to 5 KVpp to extend both lateral ends of the surface discharge area to the respective lateral ends of the inducing electrode over the entire length. The measured non-uniformity was plus and minus 3%.

According to the present invention, the non-uniformity of charging can be reduced as described above, and in addition, the abrupt charging can be avoided.

Figure 5:
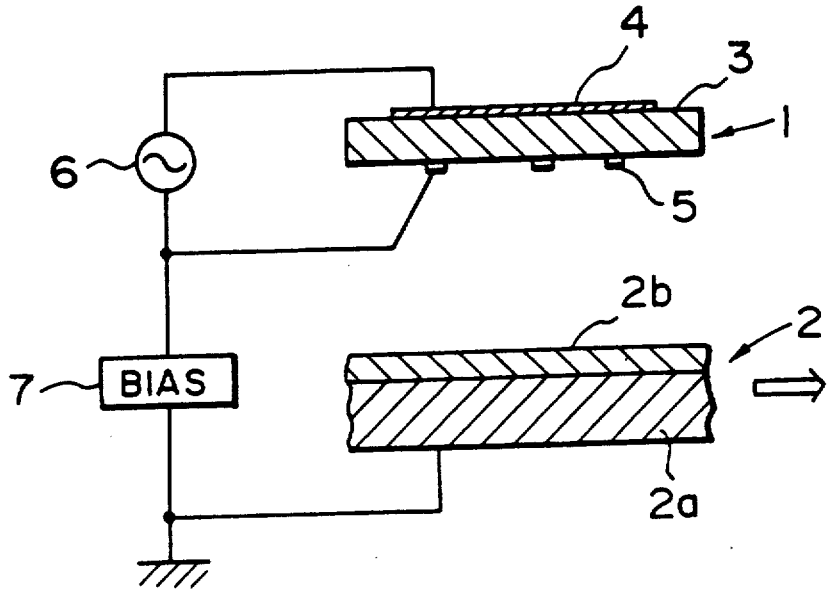
FIG. 5 shows a discharging device according to another embodiment of the present invention.
Figure 6A:
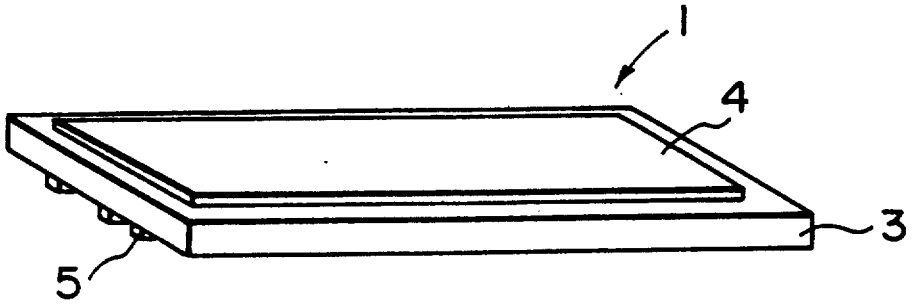
FIG. 6A is a perspective view of a discharging member used with the discharging device shown in FIG. 5.

FIGS. 5 and 6A show a discharging device according to another embodiment of the present invention. FIG. 6A is a perspective view of the discharging member 1. Since this embodiment is similar to the embodiment described with FIGS. 1 and 2, except that the discharging electrode 5 is comprised of plural rows of discharging electrode members disposed at the intervals which will be described in detail hereinafter, and that the width of the inducing electrode 4 is correspondingly larger, the detailed description of the similar parts is ommited for the sake of simplicity by assigning the same reference numerals to the elements having the corresponding functions.

Figure 7A:
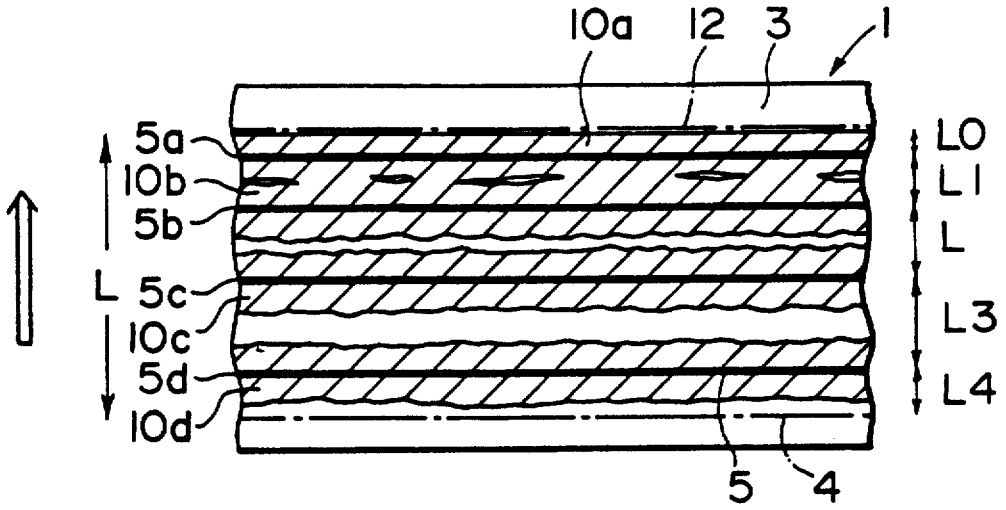
FIG. 7A shows a state of a surface discharge in the discharging device of FIGS. 5 and 6.

FIG. 7A shows the embodiment but it has four discharging electrode member 5a, 5b, 5c and 5d. The topmost discharging electrode member 5a and the bottommost discharging electrode member 5d are so disposed that the distance L0 between the topmost discharging electrode member 5a and the upper lateral end of inducing electrode 4 is smaller than the distance L4 between the bottommost discharging electrode member 5 and the lower end of inducing electrode 4.

The upper boundary 12 of the surface discharge area 10a of the topmost electrode member 5a reaches substantially to the upper lateral ends of the inducing electrode 4. Therefore, the upper boundary 12 of the surface discharge area 10a is substantially rectilinear along the discharging member 1. And, the ion density within this area is uniform along the length thereof. However, because of the above-described dimensional conditions, the lower boundary 13 of the surface discharge area 10d is not uniform.

It is preferable that the distance L1, L2 and L3 between adjacent electrode members increase toward the lower part in FIG. 7A, that is, $L1<L2<L3 \ldots Ln$. Further, it is preferable that the distance L0 between the upper lateral end of the inducing electrode and the topmost discharging electrode member 5a is smaller than one half of the distance L1 between the topmost electrode member 5a and the adjacent electrode member 5b, and that the distance L4 between the lower lateral end of the inducing electrode 4 and the bottommost discharging electrode member 5a is larger than one half of the distance L3 between the bottommost electrode member 5d and the adjacent electrode member 5c, namely, $L0<(\frac{1}{2})L1$, and $L4>(\frac{1}{2})L3$.

Since the distances between the adjacent electrode members 5a, 5b, 5c and 5d are so related as described above, the lower boundary of the surface discharge 10a is partially contacted or superposed with the upper part of the surface discharge area extending from the discharge electrode member 5b. However, they are apart at some portions so that they are generally non-uniform. Between the electrode members 5b and 5c, and between the electrode member 5c and 5d, the surface discharge areas are spaced further apart. However, the upper boundary 12 of the surface discharge area 10a is substantially coincident with the upper lateral end of the inducing electrode 4 and is substantially rectilinear, and the ion density is uniform along the length of the discharging member 1, whereby, if the member 2 to be charged is opposed to the discharging member 1 and is moved relative thereto so as to first be subjected to the lower surface discharge area 10d of the discharging member 1 and then to the upper surface discharge area 10c, 10b and 10a in this order, the influence of the nonuniformity of the surface discharge area is removed by this final surface discharge area 10a, so that a substantially uniform charging is provided.

As in the previous embodiment, the charge density in the surface discharge area 10a is higher than that of the lower surface discharge areas, which gradually decreases toward the lower part in the Figure. Therefore, when the member 2 to be charged is moved in the above-described direction, it is first subjected to a relatively weak charging with the lower charge density, and the charging power is gradually increased until it is charged to a desired level by the highest charge density surface discharge area.

As described hereinbefore, this is particularly advantageous in an electrophotographic process or the like.

Figure 6B:
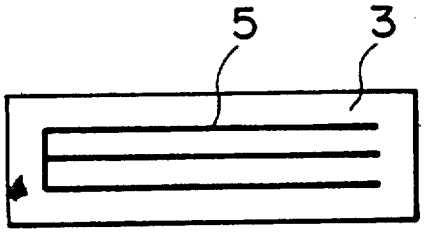
FIGS. 6B, 6C and 6D show examples of electrically connecting plural rows of discharging electrodes.
Figure 6C:
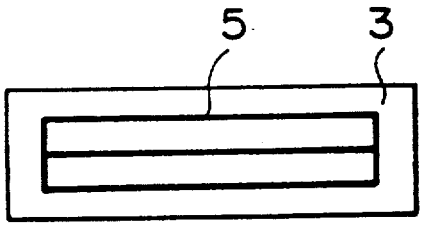
Figure 6D:
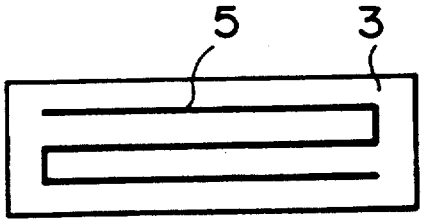

The plural rows of electrode members may be electrically connected in the fashion of a comb as shown in FIG. 6B; connected at opposite ends as shown in FIG. 6C; or connected in a zig-zag fashion as shown in FIG. 6D.

Where plural electrode members are used, the intervals between adjacent ones are preferably monotonously decreased as described above. However, when the number thereof is large, it is not necessary that they decrease monotonously in the strict sense, if they are generally decreasing.

By raising the peak-to-peak value of the alternating voltage applied between the inducing electrode 4 and the discharging electrode 5, the width of the surface discharge area extending from each of the discharging electrode members increases, until the surface discharge occurs over the entire width of the inducing electrode 4.

Figure 7B:
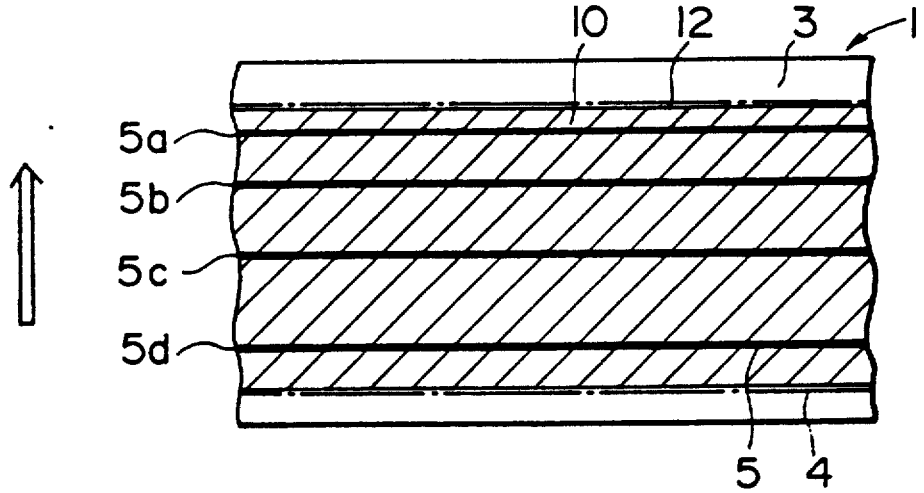
FIG. 7B shows a state wherein the surface discharge area is totally uniform along the longitudinal direction.

FIG. 7B shows such a state. In this embodiment, the peak-to-peak voltage of the alternating voltage is such that both sides of the surface discharge area are substantially coincident of the respective lateral ends of the inducing electrode 4, and such that there is no missing part of the surface discharge between the electrode members 5a, 5b, 5c and 5d. As shown, both of the lateral sides of the entire surface discharge area extend substantially to the respective lateral sides of the inducing electrode 4 so that the surface discharge area is totally uniform along the longitudinal direction.

When the member 2 to be charged is subjected to the charging operation in the manner shown in FIG. 1 with the above described discharger, the member 2 to be charged is further uniformly charged. As described above, the surface discharge area does not extend beyond the width L of the inducing electrode 4, even if the voltage is increased. The only change is the increase of the charge density in the surface discharge area 10. The charge density is uniform along the length of the entire discharging member 1 at a given position in width direction. Additionally, the charge density gradually increases from one lateral end to another lateral end, so that it is advantageous when used with an electrophotography process since abrupt charging can be avoided, as in the case of FIG. 3B.

By using this phenomenon to the maximum extent, a charging can be made relatively stable against the charge in ambient conditions so that a satisfactory charging can be effected.

When the discharging electrode is comprised by a single electrode member, the surface discharge area width is determined by the peak-to-peak value of the alternating voltage. Therefore, in order to increase the width of the surface discharge area, it is necessary to raise the voltage to a relatively great extent. Where, however, a plurality of electrode members are used, the width can be increased without the necessity of raising the voltage to such an extent. The width can be increased as desired by increasing the number of the electrode members, thus remarkably enhancing the charging or discharging efficiency. Further, by changing the intervals between the electrode members, the charge density distribution can be changed.

Figure 7C:
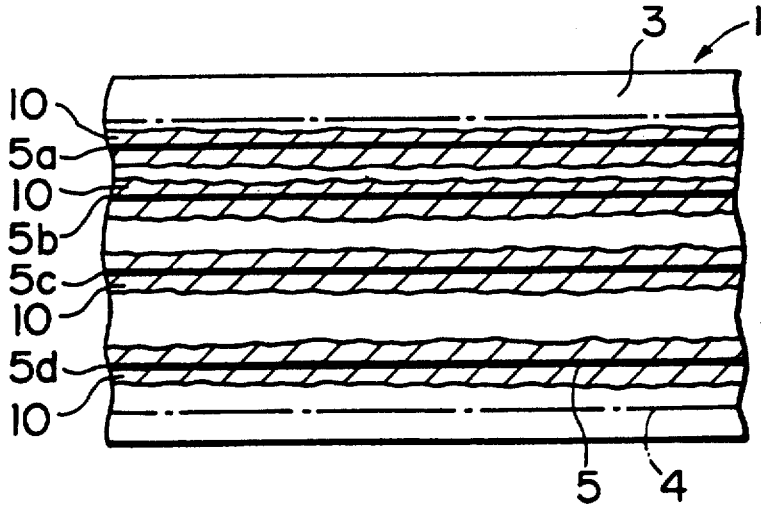
FIG. 7C shows a state of a surface discharge when the surface discharge is not sufficient.

FIG. 7C illustrates the state of the surface discharge which is different from those described above. In this Figure, the surface discharge areas 10a, 10b, 10c and 10d extend from the respective discharge electrode members 5a, 5b, 5c and 5d, and the width of each of them is non-uniform along the length. So, if the member 2 to be charged is moved as shown in FIG. 1 to charge the surface of the insulating or photoconductive layer 2b, the distribution of the resultant charging is not uniform along the length of the discharging member 1 as in FIG. 3A.

The dielectric member 3 of alumina ceramics having the thickness of 200 microns was sandwiched by the inducing electrode 4 having the width of 16 mm and four discharging electrode members 5a, 5b, 5c and 5d spaced by 1 mm(L0), 3 mm(L1), 4 mm (L2), 5 mm (L3) and 3 mm (L4), respectively, and each having the width of 500 microns. Between the discharging electrode members and the inducing electrode 4, an alternating voltage having the peak-to-peak value of 2 KVpp was applied. The surface discharge area did not extend to the lateral ends of the inducing electrode 4, as in FIG. 7C. When the member 2 to be charged was subjected to the discharging member 1 with the output of the bias voltage by the bias source 7 being 2 KV, the non-uniformness of plus and minus 7.5% was measured on the surface of the member 2.

Then, the alternating voltage was increased up to 3 KVpp to extend at least the surface discharage area 10a of the topmost electrode member 5a substantially to the upper lateral end of the inducing electrode 4, and the charging was carried out under the same conditions. The measured non-uniformness was plus and minus 4%. Further, the alternating voltage is raised up to 5 KVpp to extend the surface discharge areas to cover the entire area corresponding to the inducing electrode 4. The measured non-uniformness was plus and minus 2.5%.

According to the present invention, the non-uniformness of charging can be reduced as described above, and in addition, the abrupt charging can be avoided.

Figure 8:
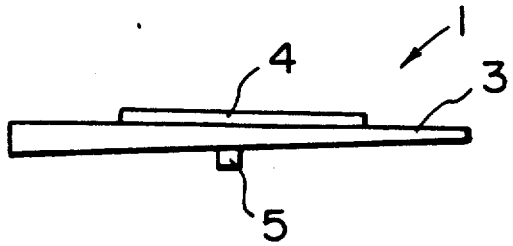
FIG. 8 shows another embodiment of the present invention.

As for other alternatives for effecting the gradual increase of the charging power, the thickness of the dielectric member 3 may be changed in the direction of the width as shown in FIG. 8. In this structure, the electric field around the discharging electrode 5 is stronger with the decrease of the dielectric member 3 thickness, the surface discharge area extends more to the thin dielectric member side. The discharging electrode 5 may be comprised by plural rows of discharging electrode members. In this embodiment, the thickness charges continuously, but it may be changed stepwisely.

Alternatively, where plural discharging electrode members are used, the voltage applied thereto may be changed gradually.

As described above, according to the present invention, the member to be charged or discharged can be first charged with a weak charging power and then charged with an increasing charging power without the necessity of using a special control means, and in addition the substantially uniform charging can be achieved in the small-sized discharging device.

In each of the above-described embodiments, surface discharge area width 1 is dependent on the material, dielectric constant and the surface resistivity of the dielectric member 3, but person with ordinary skill in the art can determine the peak-to-peak value in accordance with those factors without difficulty.

Also, the width varies in dependence on the ambient conditions, such as atmospheric pressure, temperature, humidity and the degree of stain of the dielectric member 3 surface. The peak-to-peak value can be so determined, based on the actual conditions under which the device is used, that the surface discharge area 10 extends substantially to the lateral ends of the inducing electrode 4, and such determination is desirable.

The alternating voltage is not limited to a usual AC voltage, and may be rectangular wave voltage or pulse alternating voltage.

The foregoing explanation has been made with respect to the charging of a member. Where the discharging device is placed closer to the member, the member can be discharged, that is, an electric charge can be removed from the member. In this case, the voltage source 7 is not necessary. The present invention described is usable, and the advantages thereof can be provided, also in this case.

The voltage source 7, when used, may supply a DC voltage or pulsating voltage if the ions generated near the discharging electrode 5 can be directed to the member to be charged or discharged. While the invention has been described with reference to the structures disclosed herein, it is not confined to the details set forth and this application is intended to cover such modifications or changes as may come within the purposes of the improvements or the scope of the following claims.

What is claimed is:

1. A method of charging or discharging a member comprising the steps of:

opposing a discharging member to a member to be acted on, said discharging member having a dielectric member, and having an inducing electrode and a discharging electrode sandwiching the dielectric member so that the discharging electrode faces the member to be acted on, wherein the discharging electrode extends on a surface of the dielectric member parallel to a center line of the inducing electrode at such a position that the discharging electrode is spaced away from one lateral end of the inducing electrode by a smaller distance than from the other lateral end of the inducing electrode;

applying an alternating voltage between the inducing electrode and the discharging electrode to product a surface discharge area on a surface of the dielectric member at the discharging electrode side, wherein one of the lateral ends of the surface discharge area is substantially coincident with said one of the lateral ends of the inducing electrode; and moving the member to be acted on relative to the discharging electrode to charge or discharge the member to be acted on by the thus formed surface discharge.

2. A device for charging or discharging a member, comprising:

a dielectric member;

an inducing electrode and a discharging electrode sandwiching said dielectric member, wherein the discharging electrode extends on a surface of the dielectric member along a center line of the inducing electrode at such a position that the discharging electrode is spaced away from one lateral end of the inducing electrode by a smaller distance than from the other lateral end of the inducing electrode; and a power source for applying an alternating voltage between said inducing electrode and said discharging electrode to produce a surface discharge on a surface of the dielectric member at the discharging electrode side, wherein one of the lateral ends of the surface discharge area is substantially coincident with said one of the lateral ends of the inducting electrode.

3. A device according to claim 2, wherein said discharging electrode has plural rows of discharging electrode members, and wherein a distance between said one of the lateral ends of said dielectric member and a row of the discharging electrode members which is closest to said one lateral end is smaller than a distance between said other lateral end of said dielectric member and a row of the discharging electrode members which is closest to said other lateral end.

4. A device according to claim 3, wherein distances between adjacent rows of electrode members decreases toward said one of the lateral ends.

5. A method of charging or discharging a member comprising the steps of:

opposing a discharging member to a member to be acted on, said discharging member having a dielectric member, and having an inducing electrode and a discharging electrode sandwiching the dielectric member so that the discharging electrode faces the member to be acted on, wherein the discharging electrode extends on a surface of the dielectric member along a center line of the inducing electrode at such a position that the discharging electrode is spaced away from one lateral end of the inducing electrode by a smaller distance than from the other lateral end of the inducing electrode;

applying an alternating voltage between the inducing electrode and the discharging electrode to produce a surface discharge on a surface of the dielectric member at the discharging electrode side, wherein a charge density adjacent said one of the lateral ends of the inducing electrode is higher than that adjacent said other end thereof; and moving the member to be acted on relative to the discharging electrode to charge or discharge the member to be acted on by the thus formed surface discharge.

6. A method of charging or discharging a member comprising the steps of:

opposing a discharging member to a member to be acted on, said discharging member having a dielectric member and having an inducing electrode and a discharging electrode sandwiching the dielectric member so that the discharging electrode faces the member to be acted on, wherein the discharging electrode extends on a surface of the dielectric member along a center line of the inducing electrode and wherein the dielectric member has a thickness increasing in a direction from one lateral end of the inducing electrode to the other lateral end thereof;

applying an alternating voltage between the inducing electrode and the discharging electrode to produce a surface discharge on a surface of the dielectric member at the discharging electrode side, wherein a charge density adjacent said one lateral end of the inducing electrode is higher than that adjacent said other end thereof; and moving the member to be acted on relative to the discharging electrode to charge or discharge the member to be acted on by the thus formed surface discharge.

7. A method of charging or discharging a member comprising the steps of:

opposing a discharging member to a member to be acted on, said discharging member having a dielectric member and having an inducing electrode and a discharging electrode sandwiching the dielectric member so that the discharging electrode faces the member to be acted on, wherein the discharging electrode extends on a surface of the dielectric member along a center line of the inducing electrode and wherein the dielectric member has a thickness increasing in a direction from one lateral end of the inducing electrode to the other lateral end thereof;

applying an alternating voltage between the inducing electrode and the discharging electrode to produce a surface discharge on a surface of the dielectric member at the discharging electrode side, wherein one of the lateral ends of the surface discharge area is substantially coincident with said one lateral end of the inducing electrode; and moving the member to be acted on relative to the discharging electrode to charge or discharge the member to be acted on by the thus formed surface discharge.

8. A method according to claims 1, 5, 6 or 7, further comprising the step of forming a bias electric field between the discharging electrode and said member to be acted on to move ions produced by the surface discharge, said field being formed with a predetermined polarity with respect to the member to be acted on.

9. A method according to claim 6 or 7, wherein the thickness of the dielectric member increases continuously.

10. A method according to claims 6 or 7, wherein the thickness of the dielectric member increases in steps.

11. A device for charging or discharging a member, comprising:

a dielectric member;

an inducing electrode and a discharging electrode sandwiching said dielectric member, wherein the discharging electrode extends on a surface of the dielectric member along a center line of the inducing electrode at such a position that the discharging electrode is away from one lateral end of the inducing electrode by a smaller distance than from the other lateral end of the inducing electrode; and a power source for applying an alternating voltage between said inducing electrode and said discharging electrode to produce a surface discharge on a surface of the dielectric member at the discharging electrode side, wherein a charge density adjacent said one lateral end of the inducing electrode is higher than that adjacent said other end thereof.

12. A device for charging or discharging a member, comprising:

a dielectric member;

an inducing electrode and a discharging electrode sandwiching said dielectric member, wherein the discharging electrode extends on a surface of the dielectric member along a center line of the inducting electrode and wherein said dielectric member has a thickness increasing in a direction from one lateral end of the inducing electrode to the other lateral end of the inducing electrode; and a power source for applying an alternating voltage between said inducing electrode and said discharging electrode to produce a surface discharge on a surface of the dielectric member at the discharging electrode side, wherein a charge density adjacent said one lateral end of the inducing electrode is higher than that adjacent said other end thereof.

13. A device for charging or discharging a member, comprising:

a dielectric member;

an inducing electrode and a discharging electrode sandwiching said dielectric member, wherein the discharging electrode extends on a surface of the dielectric member along a center line of the inducing electrode and wherein said dielectric member has a thickness increasing in a direction from one lateral end of the inducing electrode to the other end of the inducing electrode; and a power source for applying an alternating voltage between said inducing electrode and said discharging electrode to produce a surface discharge on a surface of the dielectric member at the discharging electrode side, wherein one of the lateral ends of the surface discharge area is substantially coincident with said one of the lateral ends of the inducting electrode.

14. A device according to claims 2, 11, 12 or 13, further comprising means for applying a bias electric field between the discharging electrode and the member to be acted on to move ions produced by the surface discharge, said field having a predetermined polarity with respect to the member to be acted on.

15. A device according to claims 12 or 13, wherein the thickness of the dielectric member increases continuously.

16. A device according to claims 12 or 13, wherein the thickness of the dielectric member increases in steps.

* * * * *

UNITED STATES PATENT AND TRADEMARK OFFICE

CERTIFICATE OF CORRECTION

PATENT NO. :RE 33,633

DATED :July 9, 1991

INVENTOR(S) :NAGAO HOSONA, ET AL.

It is certified that error appears in the above-identified patent and that said Letters Patent is hereby corrected as shown below:

On the Title page, item [75],

"Hidemi Egami, Zami;" should read --Hidemi Egami, Zama;--.

COLUMN 1:

Line 10, "continuation-in-part" should read --continuation--;
Line 14, "BACKBROUND" should read --BACKGROUND--; and
Line 42, "is" should be deleted.

COLUMN 3:

Line 21, "aclylic" should read --acrylic--;
Line 38, "width 1" should read --width ℓ--;
Line 47, "width 1" should read --width ℓ--; and
Line 53, "the a" should be deleted.

UNITED STATES PATENT AND TRADEMARK OFFICE

CERTIFICATE OF CORRECTION

PATENT NO. :RE 33,633

DATED :July 9, 1991

INVENTOR(S) :NAGAO HOSONA, ET AL.

It is certified that error appears in the above-identified patent and that said Letters Patent is hereby corrected as shown below:

COLUMN 4:

Line 24, "the" (second occurrence) should be deleted;
Line 44, "photosenitive" should read --photosensitive--; and
Line 50, "powder," should read --power,--.

COLUMN 5:

Line 59, "discharage" should read --discharge--.

COLUMN 6:

Line 14, "ommited" should read --omitted--;
Line 18, "electrode member 5a, 5b, 5c and 5d." should read --electrode members 5a, 5b, 5c and 5d.--;
Line 52, "surface discharge 10a" should read --surface discharge area 10a--;
Line 58, "electrode member 5c and 5d," should read --electrode members 5c and 5d,--; and
Line 68, "area" should read --areas--.

UNITED STATES PATENT AND TRADEMARK OFFICE

CERTIFICATE OF CORRECTION

PATENT NO. :RE 33,633 Page 3 of 4

DATED :July 9, 1991

INVENTOR(S) :NAGAO HOSONA, ET AL.

It is certified that error appears in the above-identified patent and that said Letters Patent is hereby corrected as shown below:

COLUMN 7:

Line 23, "monoto-" should read --linearly--;
Line 24, "nously" should be deleted;
Line 26, "monotonously" should read --linearly--; and
Line 63, "charge" should read --change--.

COLUMN 8:

Line 39, "discharage" should read --discharge--; and
Line 61, "charges" should read --changes--, and "stepwisely." should read --stepwise.--.

COLUMN 9:

Line 5, "width 1"" should read --width ℓ--; and
Line 55, "product" should read --produce--.

COLUMN 10:

Line 17, "induct-" should read -- induc- --; and
Line 28, "decreases" should read --decrease--.

UNITED STATES PATENT AND TRADEMARK OFFICE

CERTIFICATE OF CORRECTION

PATENT NO. : RE 33,633 Page 4 of 4

DATED : July 9, 1991

INVENTOR(S) : NAGAO HOSONA, ET AL.

It is certified that error appears in the above-identified patent and that said Letters Patent is hereby corrected as shown below:

COLUMN 11:

Line 7, "and moving" should read --and ¶ moving--; and
Line 44, "claim 6 or 7," should read --claims 6 or 7,--.

COLUMN 12:

Line 16, "induct-" should read -- induc- --; and
Line 45, "induct-" should read -- induc- --.

Signed and Sealed this

Eighth Day of June, 1993

Attest:

Michael K. Kirk

MICHAEL K. KIRK

Attesting Officer

Acting Commissioner of Patents and Trademarks